(12) United States Patent
Chiu et al.

(10) Patent No.: US 7,171,380 B2
(45) Date of Patent: Jan. 30, 2007

(54) METHOD AND SYSTEM FOR PROCESSING RETURN PRODUCT

(75) Inventors: Hung-Liang Chiu, Taipei (TW); Min-Tzu Song, Taipei (TW)

(73) Assignee: Inventec Corporation, Taipei (TW)

( * ) Notice: Subject to any disclaimer, the term of this patent is extended or adjusted under 35 U.S.C. 154(b) by 830 days.

(21) Appl. No.: 10/044,169

(22) Filed: Oct. 22, 2001

(65) Prior Publication Data

US 2003/0046180 A1 Mar. 6, 2003

(51) Int. Cl.
*G06Q 20/00* (2006.01)

(52) U.S. Cl. .......................................... 705/28; 705/29

(58) Field of Classification Search ................. 705/28, 705/29, 22, 8
See application file for complete search history.

(56) References Cited

U.S. PATENT DOCUMENTS

| | | | |
|---|---|---|---|
| 6,536,659 B1* | 3/2003 | Hauser et al. | 235/375 |
| 2002/0120535 A1* | 8/2002 | Yu | 705/29 |
| 2003/0033260 A1* | 2/2003 | Yashiro et al. | 705/400 |
| 2003/0061128 A1* | 3/2003 | Lin et al. | 705/29 |
| 2003/0200130 A1* | 10/2003 | Kall et al. | 705/8 |
| 2004/0117383 A1* | 6/2004 | Lee et al. | 707/100 |

* cited by examiner

*Primary Examiner*—Ronald Laneau

(57) ABSTRACT

A method and a system for processing a return product are proposed, in which the system for processing a return product allows a manufacturer to inquire return product data through a browser of a terminal device and a network communication system. If a return product is tested to function properly by the system, the return product can be packed for exportation if necessary. If a return product does not function properly and is disassembled for obtaining useful assemblies, semi-fabricated products are re-assembled with the useful assemblies to be ready for exportation. If a return product not properly functioning is not disassembled, the return product can be replaced for its unuseful assemblies by useful assemblies, so as to be ready for exportation. This therefore effectively utilizes useful assemblies of return products, and shortens the production time, as well as avoids repetition in work.

8 Claims, 5 Drawing Sheets

FIG. 4(A)

Return product lacking assembly file code：PL01032902

**\*PL01032902\***

List：Return product ID/Client code/Product category code
1.0000001356/1J0ADSX80002/PC7101FAA128

| Item | Assembly code | Quantity | Content |
|------|---------------|----------|---------|
| 1 | 113823-121 | 1 | PRODUCTBRICK |
| 2 | 159224-001 | 1 | ACADPT |
| 3 | 178655-002 | 1 | CARD,NIC-1 |
| 4 | 180680-121 | 1 | QRCDKIT |
| 5 | 182761-051 | 1 | 3RDPARTY |
| 6 | 191841-002 | 1 | CARD,RTFLOCATI |
| 7 | 195232-002 | 1 | CARD,RTF |
| 8 | 196823-002 | 1 | CARD,RTFCOA |
| 9 | 213349-001 | 1 | POWERCORD |
| 10 | 307366-001 | 1 | MODEMCABLE |

FIG. 4(B)

| | Lacking assembly report | | |
|---|---|---|---|
| Client code | Assembly code | Quantity | Date |
| 1J0ADSY80031 | 113823-121 | 1 | 2000/2/25 |
| 1J0ADSY80031 | 155166-001 | 1 | 2000/2/25 |
| 1J0ADSY80031 | 159224-001 | 1 | 2000/2/25 |
| 1J0ADSX80002 | 113823-121 | 1 | 2000/2/25 |
| 1J0ADSX80002 | 159224-001 | 1 | 2000/2/25 |
| 1J0ADSX80002 | 178655-002 | 1 | 2000/2/25 |
| 1J0ADSX80002 | 180680-121 | 1 | 2000/2/25 |
| 1J0ADSX80002 | 182761-051 | 1 | 2000/2/25 |
| 1J0ADSX80002 | 191841-002 | 1 | 2000/2/25 |
| 1J0ADSX80002 | 195232-002 | 1 | 2000/2/25 |
| 1J0ADSX80002 | 196823-002 | 1 | 2000/2/25 |
| 1J0ADSX80002 | 213349-001 | 1 | 2000/2/25 |
| 1J0ADSX80002 | 307366-001 | 1 | 2000/2/25 |
| 1J0AFL63600V | 112666-008 | 1 | 2000/2/25 |
| 1J0AFL63600V | 128676-002 | 1 | 2000/2/25 |

METHOD AND SYSTEM FOR PROCESSING RETURN PRODUCT

FIELD OF THE INVENTION

The present invention relates to methods and systems for processing return products, and more particularly, to a method and a system for processing a return product, in which a manufacturer can inquire condition for assemblies of a return product on a browser of a terminal device, and utilizes useful assemblies in real time, so as to reduce product stock and help recycle the assemblies of the return product.

BACKGROUND OF INVENTION

Generally, after a product is exported from a manufacturer to a client, if the product is not satisfactory, the client returns the product to the manufacturer. In this case, the manufacturer performs an initial test for the return product, so as to determine if the return product is an inferior, and then conducts subsequent maintenance work.

However, during processing the return product, due to complexity of the time-consuming test and lack of informative connection among a test station, a production line and a stock managing department, the return product can not be effectively utilized in real time. This therefore increases product stock, and also reduces material reutility.

Moreover, the manufacturer can not efficiently determine if any assembly of the return product lacks, and thus cost of the lacking assembly increases the cost for the manufacturer.

Therefore, it is desired to develop a method and a system for processing a return product, for allowing a manufacturer to efficiently monitor associated information of a return product, so as to effectively utilize the return product and reduce product stock, as well as improve profit.

SUMMARY OF THE INVENTION

A primary objective of the present invention is to provide a method and a system for processing a return product, in which a manufacturer can monitor associated information of a return product in real time, so as to efficiently process and utilize the return product for reducing product stock. Moreover, in the use of the method and system for processing a return product, prior to performing a test for the return product, data relating to assemblies of the return product are established and used to determine if the assemblies of the return product are intact, thereby allowing the manufacturer to charge a client who returns the product for any lacking assembly.

In accordance with the foregoing and other objectives, the present invention proposes a method and a system for processing a return product. The method for processing a return product of the invention is applied to a system for processing a return product, which allows a manufacturer to inquire return product data through a browser of a terminal device and a network communication system, and is pre-constructed with a material database for storing a BOM (bill of material) file of each product category, wherein the BOM file includes a product category code and assembly data, and the product category code is used as an identification number of the BOM file.

The method for processing a return product comprises the steps of: (1) constructing a RMA (return material authorization) file for a return product via a return product processing station after receiving the return product from a client, wherein the RMA file includes a product category code, assembly data and a client code of the return product; (2) comparing the RMA file with a BOM file corresponding to the product category code of the return product via the system for processing a return product, so as to determine if the RMA file is identical in assembly data to the BOM file, wherein if the RMA file lacks any assembly data listed in the BOM file, it indicates the return product has lacking assemblies, and then step (3) is followed; or else, step (4) is followed; (3) constructing a return product lacking assembly file via the system for processing a return product according to the lacking assembly data, and establishing a report corresponding to the return product lacking assembly file, for being used to charge the client for the lacking assemblies of the return product; (4) performing a functional test via the return product processing station for the return product, if the RMA file contains all assembly data listed in the BOM file and the return product is intact in assembly, so as to determine if the return product functions properly, wherein if the return product functions properly, then step (5) is followed; or else, step (6) is followed; (5) constructing a product stock file via the system for processing a return product according to the return product intact in assembly and properly functioning, and packing the return product for exportation via a production line after reading the product stock file; (6) repairing the return product not functioning properly via the return product processing station, and determining if the repaired return product operates properly, wherein if the repaired return product operates properly, then the step (5) is returned; or else, step (7) is followed; (7) determining via the return product processing station if the repaired but not properly operating return product is to be disassembled for obtaining useful assemblies therein, wherein if the return product is to be disassembled, then step (8) is followed; or else, step (9) is followed; (8) constructing a material stock file via the system for processing a return product according to the disassembled useful assemblies of the return product, and re-assembling the useful assemblies to semi-fabricated products in production via the production line after reading the material stock file; and (9) constructing a testing product lacking assembly file via the system for processing a return product according to unuseful assemblies of the repaired but not properly operating return product, and replacing the unuseful assemblies of the return product with useful assemblies for making the return product be an exporting product via the production line after reading the testing product lacking assembly file.

The system for processing a return product of the invention pre-constructs a RMA (return material authorization) file for a return product from a client, and the RMA file includes a product category code, assembly data and a client code of the return product.

The system for processing a return product comprises: a processing module for receiving a request from the manufacturer and executing corresponding procedure according to the request; a material database for storing a BOM (bill of material) file of each product category, wherein the BOM file includes a product category code and assembly data, and the product category code is used as an identification number of the BOM file; an examining module for searching in the material database for a BOM file corresponding in product category code to a RMA (return material authorization) file when the processing module receives the RMA file transmitted from the return product processing station, and for comparing the RMA file HO) in assembly data with the BOM file, wherein the examining module constructs a return product lacking assembly file according to lacking assembly data if the RMA file lacks any assembly data listed in the BOM file, and the return product lacking assembly file has a dedicated ID; a lacking assembly database for storing the return product lacking assembly file constructed by the examining module; a printing module for retrieving a return product lacking assembly file from the lacking assembly database corresponding to a client code or an ID of the return product when the processing module receives a request for printing the lacking assembly data from the manufacturer, so as to form a report for the return product lacking assembly file and print out the report for charging the client for the lacking assemblies; and a stock database for storing product stock files, material stock file and testing product lacking assembly files, which are constructed by the processing module after the examining module compares product assemblies; wherein the processing module constructs a product stock file corresponding to a return product that is intact in assembly and tested to function properly by the return product processing station; if a production line executes production for a product category listed in a production plan, it reads a product stock file from the stock database corresponding to a product category code of the product category, and packs the return product for exportation; if the return product processing station disassembles the return product not functioning properly for obtaining useful assemblies, the processing module constructs a material stock file according to the useful assemblies; if the production line executes production for a product category listed in the production plan, it reads a material stock file from the stock database corresponding to a product category code or assembly data of the product category, and re-assembles semi-fabricated products with the useful assemblies to be fabricated products, which are packed for exportation; if the return product processing station does not disassemble the return product not functioning properly, the processing module constructs a testing product lacking assembly file according to unuseful assemblies of the return product not functioning properly; if the production line executes production for a product category listed in the production plan, it reads a testing product lacking assembly file from the stock database corresponding to a product category code of the product category, and replaces the unuseful assemblies of the return product with useful assemblies for making the return product be an exporting product, which is packed for exportation.

In the use of the method and system for processing a return product of the invention, if a manufacturer receives a product returned by a client, the manufacturer can inquire the return product if having any lacking assemblies in a material database via internet or intranet, so as to charge the client for the lacking assemblies of the return product. Moreover, during testing if the return product can function properly, associated assembly data relating to the return product are simultaneously established, so as to allow the manufacturer to inquire the assembly data of the return product in real time for production and stock management, and executes production according to the inquired assembly data. This therefore avoids increase in stock of return products, and effectively utilizes assemblies of the return products.

BRIEF DESCRIPTION OF THE DRAWINGS

The present invention can be more fully understood by reading the following detailed description of the preferred embodiments, with reference made to the accompanying drawings wherein:

FIGS. 4(A) and 4(B) are schematic diagrams showing practical embodiments for inquiring data relating to lacking assemblies for a return product in the use of the method and system for processing a return product of the invention.

DETAILED DESCRIPTION OF THE PREFERRED EMBODIMENT

Figure 1:
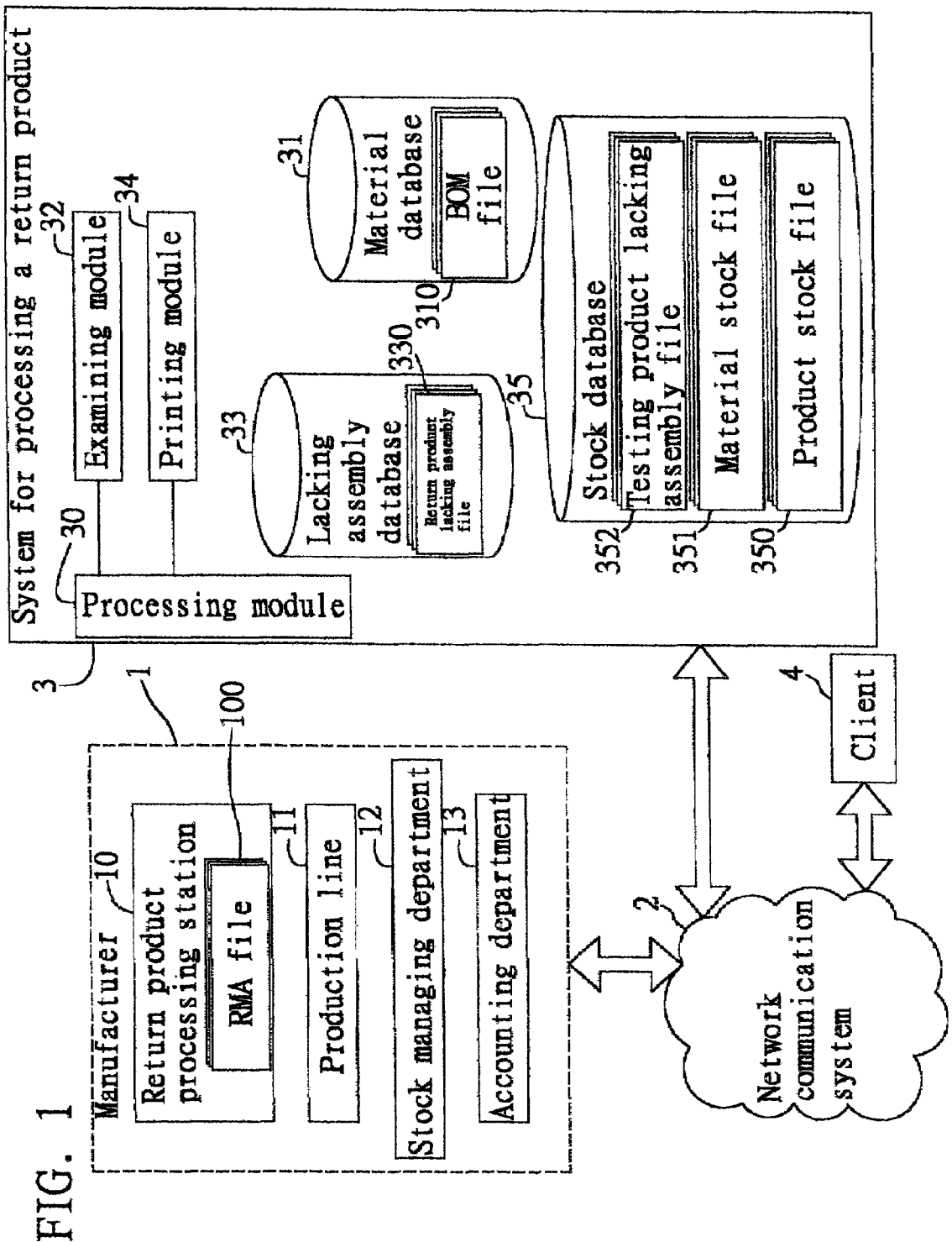
FIG. 1 is a schematic block diagram showing basic architecture of the system for processing a return product of the invention.

Referring to FIG. 1, it illustrates basic architecture of the system for processing a return product of the invention. As shown in the drawing, in the use of the system for processing a return product 3, a user of a manufacturer 1 at a terminal device (not shown) is allowed to inquire associated data relating to a return product on a browser of the terminal device through a network communication system 2. The user can be a staff in a department of a manufacturer 1, e.g. a return product processing station 10, a production line 11, a stock managing department 12, an accounting department 13, etc. These departments can have the terminal devices (not shown) thereof to be informatively connected to one another through by local network, internet or intranet.

The network communication system 2 can be internet or intranet. The system for processing a return product 3 can be a computer system or a server host, and has its internal system architecture comprising a processing module 30, a material database 31, an examining module 32, a printing module 34 and a stock database 35.

The material database 31 of the system for processing a return product 3 is pre-stored with a plurality of bill of material (BOM) files 310, which each includes at least a product category code and assembly data of the product, and the product category code is used as an identification number of the BOM file 310.

Upon receiving a product returned by a client, the return product processing station 10 of the manufacturer 1 constructs a return material authorization (RMA) file 100 for the return product, wherein the RMA file 100 includes at least a product category code, assembly data and a client code of the return product, and is transmitted by the return product processing station 10 to the system for processing a return product 3.

First, upon receipt of the RMA file 100 transmitted from the return product processing station 10, the processing module 30 activates the examining module 32 to search in the material database 31 for a BOM file 310 having a product category code corresponding to that of the RMA file 100, and to compare the assembly data in the RMA file 100 with those in the BOM file 310. When the examining module 32 determines that the assembly data in the BOM file 310 do not exist in the RMA file 100, it indicates that the return product received by the return product processing station 10 has lacking assemblies. The examining module 32 then constructs a return product lacking assembly file 330 according to the assembly data of the lacking assemblies, and stores the return product lacking assembly file 330 in a lacking assembly database 33. The return product lacking assembly file 330 includes a return product identification number (ID), a client code, a product category code and lacking assembly data, wherein the return product ID is a dedicated number.

Next, after receiving assembly lacking condition of the return product transmitted from the return product processing station 10, the accounting department 13 activates the processing module 30 to allow the printing module to search in the lacking assembly database 33 for a return product lacking assembly file 330 having a return product ID corresponding to that transmitted from the return product processing station 10. The return product lacking assembly file 330 is displayed in the form of a report on the browser of the terminal device in the accounting department 13, so as to allow a person in the accounting department 13 to obtain associated information for the assembly lacking condition of the return product. The display report relating to the assembly lacking condition on the browser can be transmitted in an e-mail or fax communication manner to the client who return the product, so as to allow the client to pay the manufacturer 1 according to the report of the assembly lacking condition.

Moreover, if the RMA file 100 with the corresponding BOM file 310 are compared by the examining module 32 to be the same for all data items therein, the processing module 30 transmits a message showing the return product with no lacking assembly to the return product processing station 10, and then a person in the return product processing station 10 performs a functional test for the return product. Upon receiving a message showing the return product proper in function transmitted from the return product processing station 10, the processing module 30 constructs a product stock file 350 according to the properly functioning return product. The stock file 350 includes a return product ID, a client code, a product category code and assembly data, and is stored in the stock database 35, wherein the return product ID is a dedicated number. When the production line 11 executes production for a product category listed in a production plan, a product stock file 350 having a product category code can be retrieved from the stock database 35 corresponding to the product category under production, and then the return product having the retrieved product category code can be readily packed for exportation. This therefore eliminates the occurrence of repetition in work for the production line, and also reduces product stock.

Furthermore, if receiving a message showing the return product not proper in function and its inferior assembly not repairable, the processing module 30 inquires the return product processing station 10 if to disassemble the return product for retaining useful assemblies. If the return product is to be disassembled, the processing module 30 constructs a material stock file 351 according to useful assembly data transmitted from the return product processing station 10. The material stock file 351 includes a return product ID, a product category code and the useful assembly data, and is stored in the stock database 35, wherein the return product ID is a dedicated number. When the production line 11 executes production for a product category listed in a production plan, a material stock file 351 having a product category code or assembly data can be retrieved from the stock database 35 corresponding to the product category under production, and then semi-produced products of the product category can be reassembled with useful assemblies of the corresponding return product, so as to be readily exported after being completely produced. This therefore effectively utilizes the useful assemblies of the return product, and also reduces assembly stock.

In addition, if the return product is not to be disassembled, the processing module 30 constructs a testing product lacking assembly file 352 according to unuseful assembly data transmitted from the return product processing station 10. The testing product lacking assembly file 352 includes a return product ID, a product category code and the unuseful assembly data, and is stored in the stock database 35, wherein the return product ID is a dedicated number. When the production line 11 executes production for a product category listed in a production plan, a testing product lacking assembly file 352 having a product category code can be retrieved from the stock database 35 corresponding to the product category under production, and then the return product is replaced with useful assemblies for unuseful assemblies, so as to be readily packed for exportation. This therefore shortens time for completely producing a product, and also effectively utilizes useful assemblies of the return product.

Therefore, in the use of the system for processing a return product of the invention, the manufacturer 1 can inquire associated information relating to a return product, and all departments are able to monitor the processing for the return product, so as to utilize the return product in real time, and reduce production cost and product stock.

Figure 2:
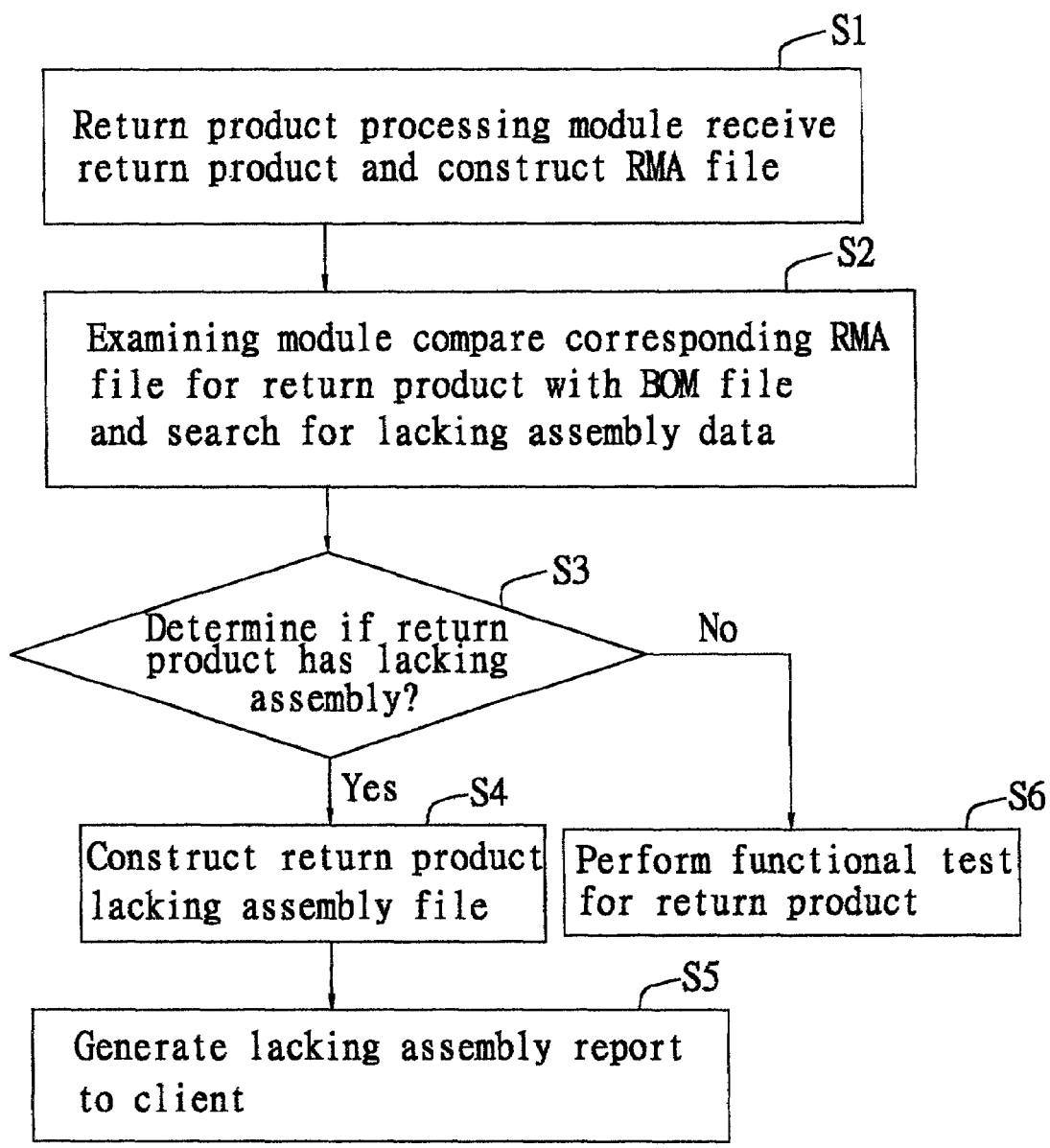
FIG. 2 is a schematic diagram showing the steps depicting the method for processing a return product in the use of the system for processing a return product of the invention.

Referring to FIG. 2, it illustrates the method for processing a return product in the use of the system for processing a return product of the invention. The following description is made with reference to FIGS. 1 and 2.

First in step S1, upon receiving a return product, a return production processing station 10 constructs a RMA (return material authorization) file 100 corresponding to the return product, and transmits the RMA file 100 to the system for processing a return product 3, wherein the RMA file 100 includes a product category code, assembly data and a client code of the return product. Thereafter, step S2 is followed.

In step S2, a processing module 30 activates an examining module 32 to search in a material database 31 for a BOM (bill of material) file 310 corresponding in category code to the RMA file 100, and compare the two files in assembly data. Thereafter, step S3 is followed.

In step S3, the examining module 32 determines if the BOM file 310 contains any assembly data not listed in the assembly data of the RMA file 100. If the RMA file 100 lacks any assembly data listed in the BOM file 310, then step S4 is followed; or else, step S6 is followed.

In step S4, the examining module 32 constructs a return product lacking assembly file 330 according to the assembly data lacked in the RMA file 100, and stores the return product lacking assembly file 330 in a lacking assembly database 33, wherein the return product lacking assembly file 330 includes a return product identification number (ID), a client code, a product category code and lacking assembly data, and the return product ID is a dedicated number. Thereafter, step S5 is followed.

In step S5, if an accounting department 13 requests the system for processing a return product 3 to print out the lacking assembly data of the return product, the processing module 30 activates a printing module 34 to retrieve a return product lacking assembly file 330 from the lacking assembly database 33 corresponding to the return product ID transmitted from the accounting department 13, and transmit the retrieved return product lacking assembly file 330 in the form of tables to the accounting department 13, which then sends the tables by e-mail or fax to a client who returns the product and charges the client for the lacking assemblies of the return product.

In step S6, if the examining module 32 determines that the RMA file 100 contains all the assembly data listed in the BOM file 310, the processing module 30 sends a functional test message to the return product processing station 10, and then the return product processing station 10 performs a functional test for the return product intact in assembly data.

Figure 3:
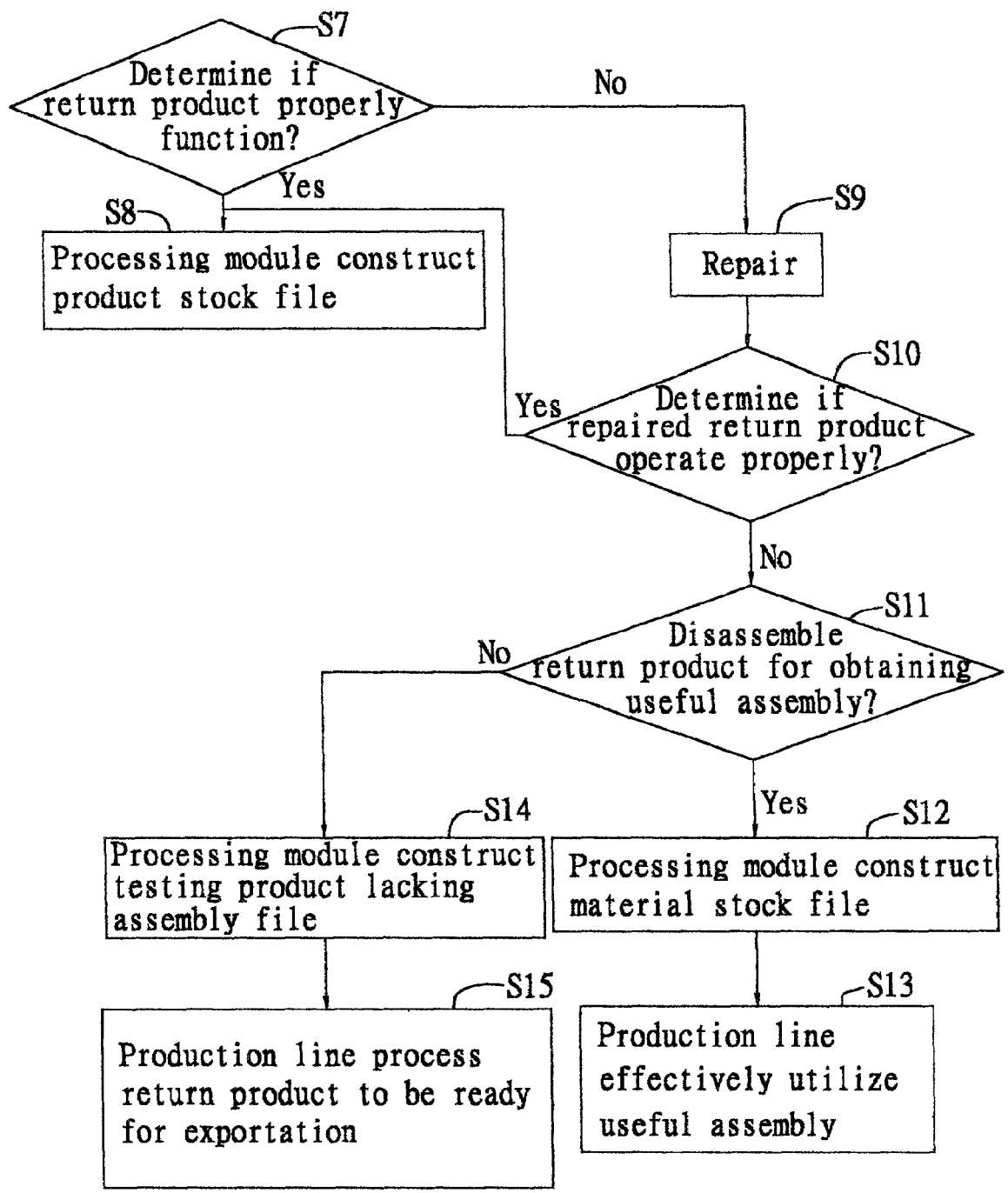
FIG. 3 is a schematic diagram in detail depicting step S6 of FIG. 2 for establishing data relating to assemblies of a return product.

Referring to FIG. 3, it illustrates in detail step S6 of FIG. 2 for establishing assembly data of a return product in a functional test. The following description is made with reference to FIGS. 1 and 3.

First in step S7, after the return product processing station 10 completes the functional test for the return product intact in assembly data, if the return product can not properly function, then step S9 is followed; or else, step S8 is followed.

In step S8, upon receiving a properly functioning message of the return product transmitted from the return product processing station 10, the processing module 30 constructs a product stock file 350 and stores the product stock file 350 in a stock database 35, wherein the product stock file 350 includes a return product ID, a client code, a product category code and assembly data of the return product, and the return product ID is a dedicated number. Therefore, if a production line executes production for a product category in a production plan, a product stock file 350 can be retrieved from the stock database 35 corresponding in product category code to the product category. Then, the return product of the product stock file 350 can be packed readily for exportation. This therefore shortens the production time and avoids repetition in work, as well as reduces product stock returned from clients.

In step S9, the return product processing station 10 repairs the return product not properly functioning, and then step S10 is followed.

In step S10, in the repairing process, the return product processing station 10 determines if the repaired return product can operates properly. If the repaired return product properly operates, then the step S8 is returned; or else, step S11 is followed.

In step S11, the return product processing station 10 determines if the return product is to be disassembled for obtaining useful assemblies. If the return product is to be disassembled, then step S12 is followed; or else, step S14 is followed.

In step S12, upon receiving a message for disassembling the return product transmitted from the return product processing station 10, the processing module constructs a material stock file 351, and stores the material stock file 351 in the stock database 35, wherein the material stock file 351 includes a return product ID, a product category code and useful assembly data of the return product, and the return product ID is a dedicated number. Thereafter, step S13 is followed.

In step S13, if a production line executes production according to a production plan, it can transmit useful assembly data required in production to the processing module 30, so as to allow the processing module 30 to retrieve a material stock file 351 from the stock database 35 corresponding to the useful assembly data. If the corresponding material stock file 351 is retrieved, the production line can effectively utilize the useful assemblies of the return product.

In step S14, upon receiving a message for not disassembling the return product transmitted from the return product processing station 10, the processing module 30 constructs a testing product lacking assembly file 352, and stores the testing product lacking assembly file 352 in the stock database 35, wherein the testing product lacking assembly file 352 includes a return product ID, a product category code and unuseful assembly data, and the return product ID is a dedicated number. Thereafter, step S15 is followed.

In step S15, if a production line executes production according to a production plan, it can transmit a product category code in production to the processing module 30, so as to allow the processing module 30 to retrieve a testing product lacking assembly file 352 from the stock database 35 corresponding to the product category code. If the corresponding testing product lacking assembly file 352 is retrieved, the production line replaces unuseful assemblies listed in the testing product lacking assembly file 352 with useful assemblies, in an effort to combine into functional products, which are packed readily for exportation. This therefore effectively utilizes useful assemblies of return products, and shortens the production time, as well as avoids repetition in work.

Illustrated in FIGS. 4(A) and 4(B) are practical embodiments for inquiring data relating to lacking assemblies for a return product in the use of the method and system for processing a return product of the invention. After a return product processing station 10 transmits a RMA file 100 constructed for each return product to the system for processing a return product 3, an examining module 32 compares the RMA file 100 with a corresponding BOM file 310 pre-constructed in a material database 31, and constructs a return product lacking assembly file 330 according to a RMA file 100 that lacks in assembly data listed in its corresponding BOM file 310. Then, if a dedicated return product ID "00000001356" is inputted by a user (e.g. an accounting department 13), the system for processing a return product 3 searches in a lacking assembly database 33 for a return product lacking assembly file 330 corresponding to the return product ID "00000001356", and displays lacking assembly data of the return product lacking assembly file 330 on a browser (not shown) of a terminal device, as shown in FIG. 4(A).

Next, as shown in FIG. 4(B), a picture 5 displays a lacking assembly report showing lacking assembly data of return products, so as to allow the accounting department 13 to charge clients who return the products for the lacking assemblies.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for processing a return product, for use with a system for processing a return product, which allows a manufacturer to inquire return product data through a browser of a terminal device and a network communication system, and is pre-constructed with a material database for storing a BOM (bill of material) file of each product category, wherein the BOM file includes a product category code and assembly data, and the product category code is used as an identification number of the BOM file; the method comprising the steps of:

(1) constructing a RMA (return material authorization) file for a return product via a return product processing station after receiving the return product from a client, wherein the RMA file includes a product category code, assembly data and a client code of the return product;

(2) comparing the RMA file with a BOM file corresponding to the product category code of the return product via the system for processing a return product, so as to determine if the RMA file is identical in assembly data to the BOM file, wherein if the RMA file lacks any assembly data listed in the BOM file, it indicates the return product has lacking assemblies, and then step (3) is followed; or else, step (4) is followed;

(3) constructing a return product lacking assembly file via the system for processing a return product according to the lacking assembly data, and establishing a report corresponding to the return product lacking assembly file, for being used to charge the client for the lacking assemblies of the return product;

(4) performing a functional test via the return product processing station for the return product, if the RMA file contains all assembly data listed in the BOM file and the return product is intact in assembly, so as to determine if the return product functions properly, wherein if the return product functions properly, then step (5) is followed; or else, step (6) is followed;

(5) constructing a product stock file via the system for processing a return product according to the return product intact in assembly and properly functioning, and packing the return product for exportation via a production line after reading the product stock file;

(6) repairing the return product not functioning properly via the return product processing station, and determining if the repaired return product operates it properly, wherein if the repaired return product operates properly, then the step (5) is returned; or else, step (7) is followed;

(7) determining via the return product processing station if the repaired but not properly operating return product is to be disassembled for obtaining useful assemblies therein, wherein if the return product is to be disassembled, then step (8) is followed; or else, step (9) is followed;

(8) constructing a material stock file via the system for processing a return product according to the disassembled useful assemblies of the return product, and re-assembling the useful assemblies to semi-fabricated products in production via the production line after reading the material stock file; and (9) constructing a testing product lacking assembly file via the system for processing a return product according to unuseful assemblies of the repaired but not properly operating return product, and replacing the unuseful assemblies of the return product with useful assemblies for making the return product be an exporting product via the production line after reading the testing product lacking assembly file.

2. The method of claim 1, wherein in the step (3), the return product lacking assembly file includes a return product identification number (ID), a client code, a product category code and lacking assembly data of the return product, and is stored in a lacking assembly database, so as to allow an accounting department to read the return product lacking assembly file and obtain associated data for charging the client for the lacking assemblies.

3. The method of claim 2, wherein the system for processing a return product further includes a printing module for storing the report formed for the return product lacking assembly file in the lacking assembly database, so as to print out the report to be sent to the client by the manufacturer via fax or post, or to send the return product lacking assembly file in the form of the report via a network communication system through e-mail to a terminal device of the client.

4. The method of claim 1, wherein in the step (5), the product stock file includes a return product ID, a client code, a product category code and assembly data of the return product, and is stored in a stock database; if the production line executes production for a product category listed in a production plan, it reads a product stock file from the stock database corresponding to a product category code of the product category, and packs the return product for exportation.

5. The method of claim 1, wherein in the step (8), the material stock file includes a return product ID, a product category code and useful assembly data of the return product, and is stored in a stock database; if the production line executes production for a product category listed in a production plan, it reads a material stock file from the stock database corresponding to a product category code or assembly data of the product category, and re-assembles the semi-fabricated products in production with the useful assemblies of the return product to be fabricated products, which are packed for exportation.

6. The method of claim 1, wherein in the step (9), the testing product lacking assembly file includes a return product ID, a product category code and unuseful assembly data of the return product; if the production line executes production for a product category listed in a production plan, it reads a testing product lacking assembly file from the stock database corresponding to a product category code of the product category, and replaces the unuseful assemblies of the return product with useful assemblies for making the return product be an exporting product, which is packed for exportation.

7. The method of claim 1, wherein the return product IDs of the return product lacking assembly file, the product stock file, the material stock file and the testing product lacking assembly file are dedicated numbers.

8. The method of claim 1, wherein the network communication system is internet or intranet.

* * * * *